July 9, 1935.  W. C. STATE  2,007,909
METHOD OF CONSTRUCTING PNEUMATIC TIRES
Filed April 23, 1932  4 Sheets-Sheet 1
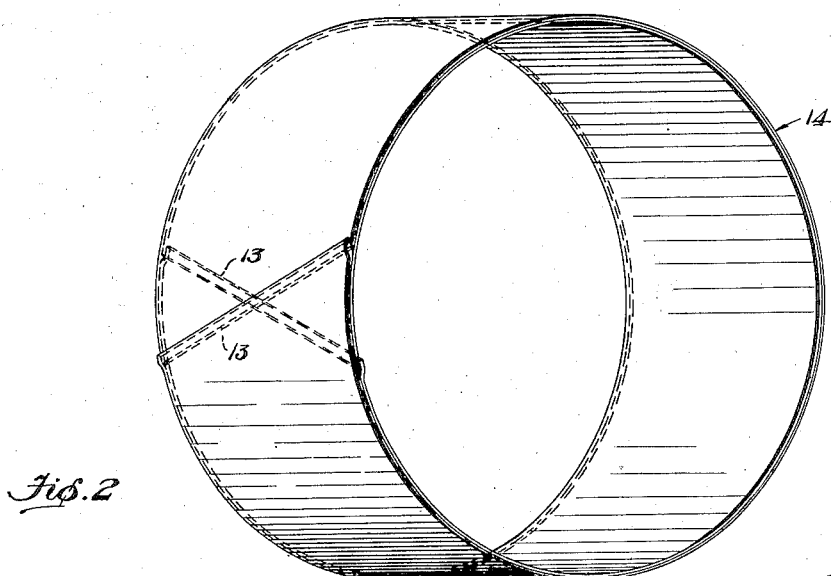
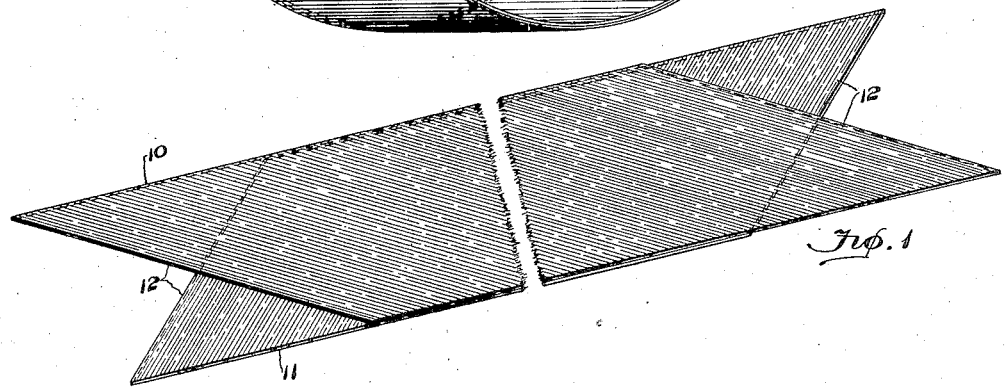
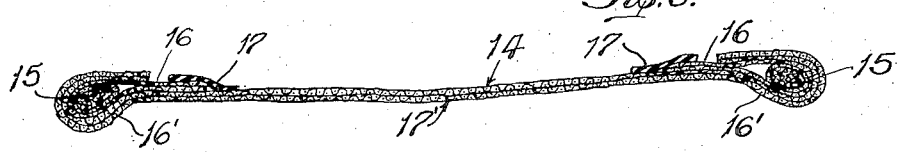
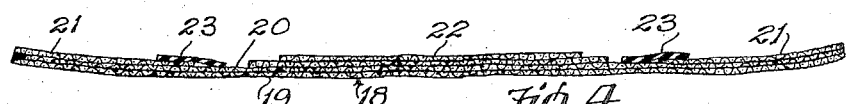
Inventor
Will C. State
By
Attorney Inventor
Will C. State By
Attorney

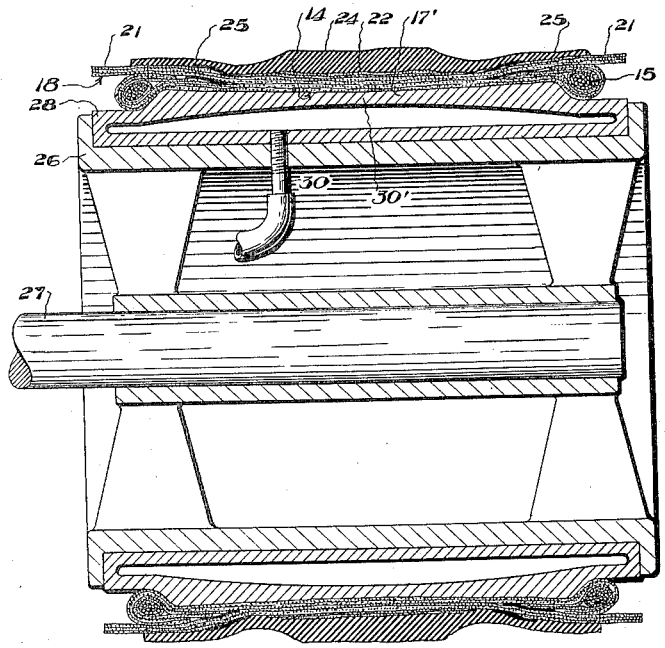
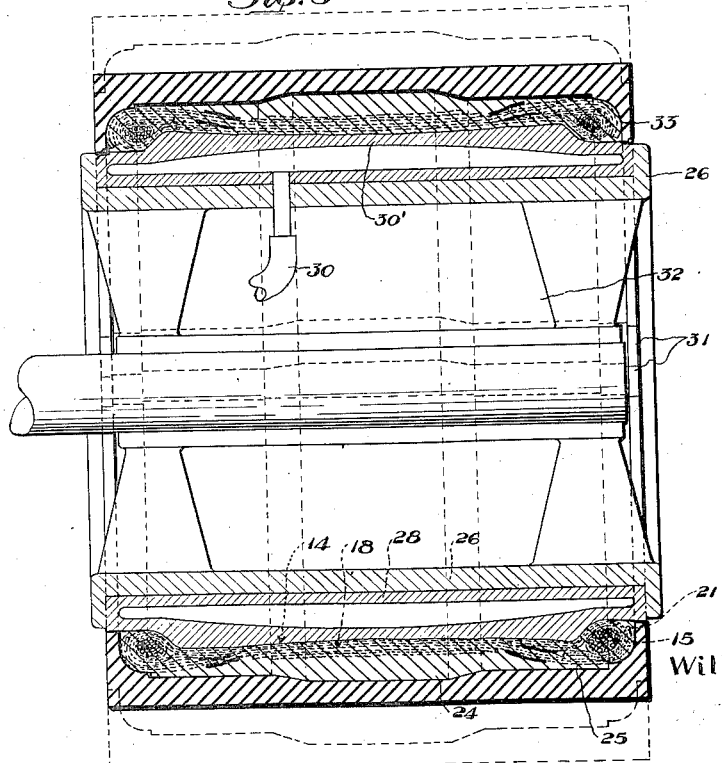

Patented July 9, 1935

2,007,909

UNITED STATES PATENT OFFICE 2,007,909

METHOD OF CONSTRUCTING PNEUMATIC TIRES

Will C. State, Fairlawn, Ohio, assignor, by mesne assignments, to Wingfoot Corporation, Akron, Ohio, a corporation of Delaware Application April 23, 1932, Serial No. 607,133

46 Claims. (Cl. 154—14)

This invention relates to a method of constructing pneumatic tires and more particularly to a novel method of assembling the various constituents of a tire into a substantially flat endless band. The band is then given a toroidal shape in the usual manner.

Heretofore, it has been customary in constructing pneumatic tires by the so-called "flat-building" method, to assemble the various plies and other parts of the tire upon a drum having a substantially flat or a slightly crowned outer surface. The plies, usually or rubberized cord fabric, were successively wound upon the drum and each was separately stitched to its adjacent preceding ply until a carcass of the desired number of plies was built up. Beads, chafing strips, gum strips and a breaker strip were properly positioned in the carcass and a rubber tread portion including sidewalls was stitched onto the carcass, thereby providing a substantially flat endless tire band. The drum was then collapsed to permit the removal of the band, the latter was given a toroidal shape and was then vulcanized in the usual manner. In building the flat tire band on a drum, a single skilled operator is employed and he must, of course, know how to carry out all of the steps in building the complete band. This prior art method has proven to be quite efficient, but has several disadvantages, which I propose to overcome. According to the present invention, the use of a tire building drum and other equipment associated therewith is eliminated.

I have invented a novel method of constructing pneumatic tires of the "flat-built" type, and a method of assembling the parts of the tire band, which permit the various operations heretofore performed by a single operator to be divided up whereby a plurality of operators each perform a small part of the whole operation. Thus, each operator need not be capable of building a complete tire band in order to be of greatest value as a productive worker, but need be familiar only with the particular part of the operation performed by him.

Accordingly, it is an object of this invention to provide a novel method of the character referred to which will permit the steps of assembling the band to be distributed among a plurality of operators specially trained in their particular duties.

Another object is to provide a method of assembling the components of a tire with a uniform and equally distributed pressure to provide a tire band, and consequently a tire, which is equally as good, and in many instances better than tires constructed by prior "flat band" methods.

A further object is to provide a method of assembling the constituents of a tire band whereby less air will be entrapped in the carcass than was usual with prior methods.

A further object is to provide a method of assembling the tread stock, as a preformed endless band, with the carcass, whereby a more even distribution of the tread stock may be obtained.

The foregoing and other objects and advantages of the invention will become apparent from the following description in connection with the accompanying drawings, wherein I have shown one practical manner in which the method may be carried out. In this showing:

Fig. 1 is a perspective view of two superimposed plies of fabric,

Fig. 2 is a similar view of the plies formed into a band,

Figure 6:
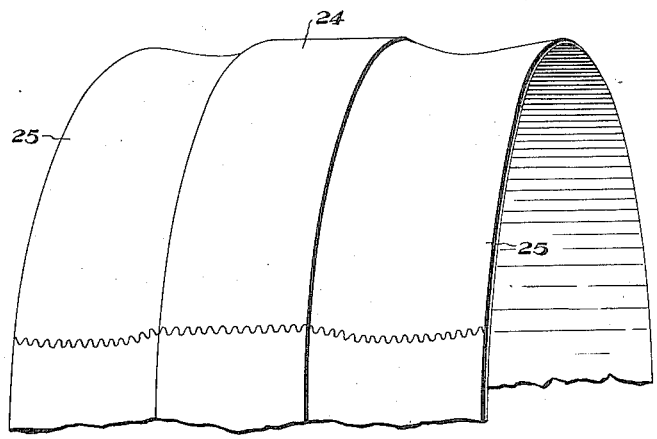
Figure 8:
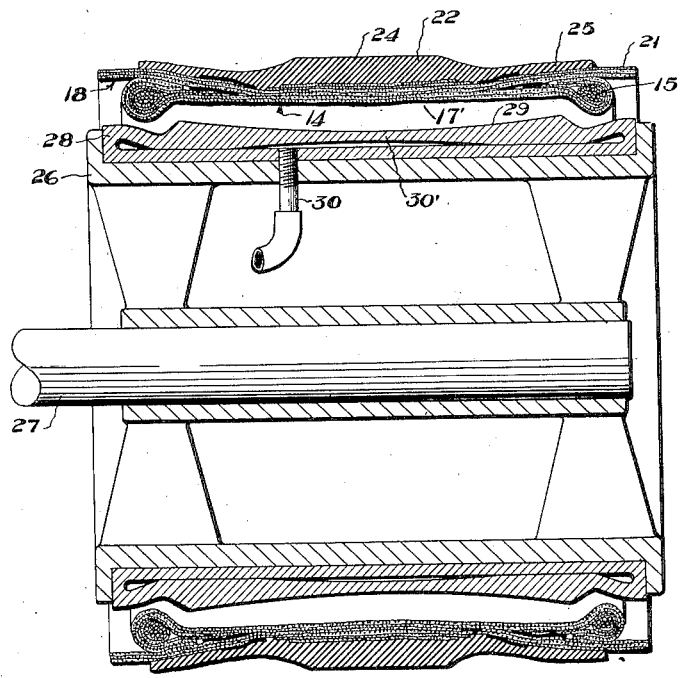
Figure 11:
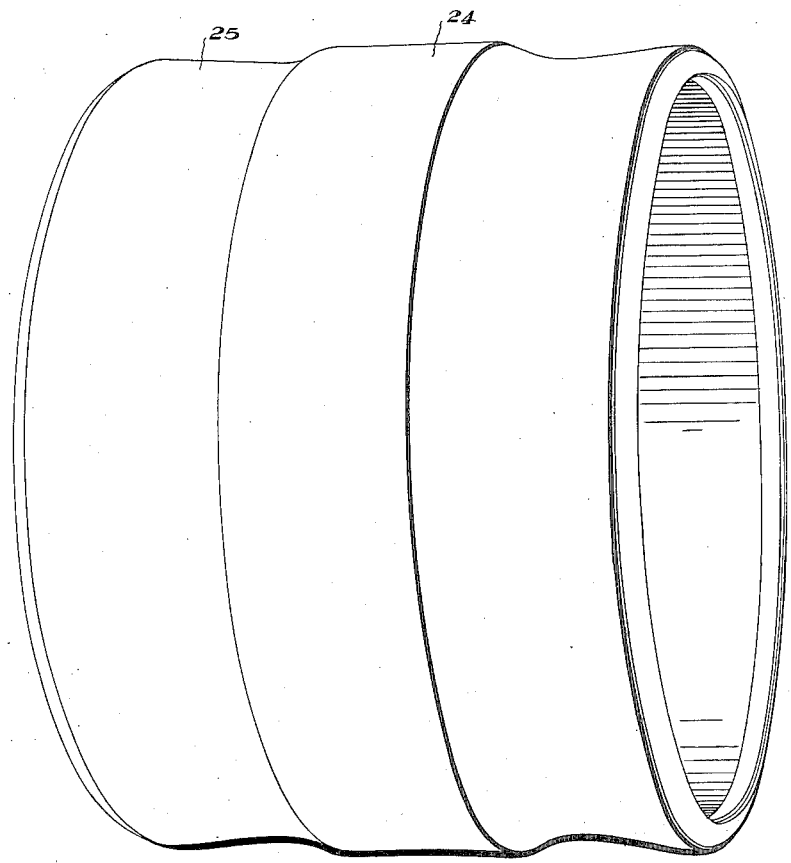
Figure 7:
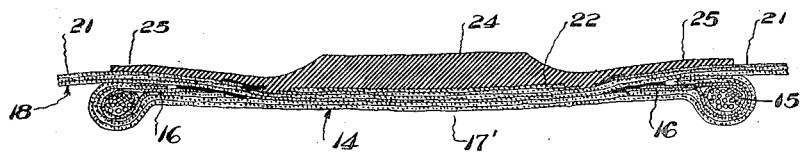

Fig. 3 is a transverse section through a portion of one band showing the beads in proper position, Fig. 4 is a similar section through a portion of another band showing the chafing strips and breaker strip in proper position, Fig. 5 is a similar section through both bands assembled, Fig. 6 is a partial perspective view of a preformed endless tread portion, Fig. 7 is a transverse section through a portion of the assembled bands and tread stock, Fig. 8 is a vertical transverse section through a drum on which the assembled parts of the tire band are mounted, with the inflatable member around the periphery of the drum in uninflated condition, Fig. 9 is a similar view with the inflatable member partially inflated, Fig. 10 is a similar section through a receiving chamber for the drum and tire band, and Fig. 11 is a perspective view of the completely assembled band.

In practicing the method, a pair of bias-cut plies 10 and 11, preferably formed of rubberized cord fabric or the like, are arranged in superimposed relation with their ends "fish-tailed" as shown at 12 in Fig. 1 and with the cords of one ply arranged at an angle with respect to those of the other. The ends of these plies are then brought together and spliced as indicated at 13 in Fig. 2 to form a two-ply endless band, the "fish-tailed" ends slightly overlapping to give a very excellent joint. It will be apparent, however, that the band may be spliced in any other suitable manner and that the cords of each ply may be arranged with respect to each other as desired.

This band, which will be referred to by the numeral 14, is then supported in any suitable manner whereby beads 15 of any ordinary or preferred type or form can be incorporated therewith. As shown in Fig. 3, the margins of the band are folded inwardly over the beads and during this folding process the portions 16' are slightly compacted to facilitate assembly with the beads. It will be noted that the inner surface of the band is slightly convex and the outer surface slightly concave after the beads are incorporated therewith. The arrangement shown permits the flipper strips 16 to lie flat upon the outer surface of the band and, if desired, gum strips 17 may be used along the edges of the flipper strips. This unit presents a groove 17' on the inner surface of the band to which further reference will be made hereinafter. The incorporation of the beads with the band 14 may be accomplished by machine as well as by hand.

In Fig. 4, I have shown a second endless band, indicated as a whole by the numeral 18, which is formed of two plies 19 and 20 in the same manner as the band 14 and preferably of similar material, except that the latter band is somewhat wider than the band 18 to permit or provide for folding the margins of the band 14 over the beads. Furthermore, the band 18 preferably is slightly larger in diameter than the band 14, for a purpose to be described.

The band 18 is supported in any suitable manner whereby chafing strips 21 and a breaker strip 22 can be applied thereto. The breaker strip is shown as being formed with two plies of material, but a single ply breaker may be used if desired. As shown in Fig. 4, the outer edges of the chafing strips preferably are arranged flush with the edges of the band and the breaker strip is placed substantially centrally thereof.

If desired, gum strips 23 may be placed along the inner edges of the chafing strips. While applying the chafing strips and breaker strip, the margins of the band 18 are stretched as in Fig. 4, whereby the marginal portions thereof will properly fit over the beads of band 14 when the two bands are brought together. The stretching of the marginal portions of the band 18 also may be done either before or after the application of the chafing and breaker strips. The application of the chafing and breaker strips also may be accomplished by machine as well as manually.

After the bands 14 and 18 have their associated portions incorporated therewith, they are brought together as shown in Fig. 5, for which purpose the effective size of the band 14 is slightly reduced, such as by partially collapsing the band, or in any other suitable manner. Thus, the band 18 comes to encircle the band 14 as a complete sub-assembly therewith, the latter being returned to its original size inwardly of band 18. No effort is made at this time to bond or press the bands together, the natural tackiness of the material being relied upon to hold the bands in their proper relative positions. It will be apparent that the larger diameter of the band 18 as compared with the band 14 permits the latter to fit neatly within the former. Moreover, it will be noted that the inner surface of band 18 also is slightly convex after the chafing and breaker strips are applied thereto and this convex portion lies evenly against the complementary concave portion of band 14 in the sub-assembly. The outer surface of band 18 also is slightly concave. In Fig. 5, I have shown the assembled bands and it will be noted that folding the margins of the band 14 around the beads reduces the width of this band whereby it now is less than the width of the band 18, the latter, with portions of the chafing strips, extending beyond the edges of the band 14. These extending portions preferably are not turned inwardly around the beads at this time as it has been found more desirable to perform this operation later. However, very good results can be obtained if the extending portions are turned inwardly without stitching at this stage of the process. This sub-assembly may be accomplished manually or by machine.

Separate from the operations referred to, a rubber cover (consisting of a tread member 24 alone or with sidewall portions 25) is suitably spliced and formed into an endless band, substantially as shown in Fig. 6. Preferably this band comprises a tread member and side wall portion. This splicing operation preferably is carried out in accordance with the disclosure in the application of J. I. Haase, Serial No. 525,416, filed March 16, 1931, but can, of course, be accomplished in any other suitable manner.

This preformed endless cover is then assembled with the carcass sub-assembly of Fig. 5 in the manner indicated in Fig. 7. In order to permit ease of assembly, the effective size of the assembled bands 14 and 18 is slightly reduced, such as by partially collapsing the bands, or in any other suitable manner. The tread band is then placed around the partially collapsed bands 14 and 18 and the latter when returned to their original size will fit snugly inside the tread band. The tread band preferably is of slightly larger diameter than the band 18 to facilitate the assembly. It will be noted that the inner surface of the tread band is partly convex which permits the latter to properly rest on the concave portion of band 18. Again it is pointed out that no effort is made to bond or press the tread stock to the bands or the latter to each other, at this time, the tackiness of the material being capable of holding the assembly in proper relative position.

After the assembly has been made as indicated in Fig. 7, it will be apparent that, as no effort has been yet made to bond the bands together, or to bond the latter to the tread stock, air is present between the plies in the assembly and must be removed if a satisfactory tire is to result. Accordingly, in Figs. 8, 9 and 10, I have illustrated one means for pressing the air out of the assembly and for bonding all the units together in one operation. The apparatus shown in these three figures has been specifically described and claimed in co-pending application, Serial No. 657,778, filed February 21, 1933, and therefore, only need be referred to generally herein.

As shown in Figs. 8 and 9, an annular drum 26 is mounted upon a reciprocating shaft 27 and the periphery of the drum is provided with an inflatable member 28 suitably secured thereto. The member 28 preferably is formed of flexible material such as rubber reinforced with cord fabric, or the like and is provided with an annular crowned outer surface 29, which fits within the annular groove 17' on the inner surface of the band 14 when the assembly is placed properly on the drum. A conduit 30 communicates at one end with the interior of the member 28 and at its other end with a source of compressed air or other suitable fluid for inflating and deflating said member, suitable valve means (not shown) being located in the conduit to control the pressure fluid. The inflatable member 28 is constructed whereby the thickness thereof is less in the vicinity of its outer central portion 30', for a purpose to be described. Fig. 8 shows the member 28 in uninflated condition and Fig. 9 shows said member partially inflated whereby a closely fitting engagement is formed between the tire band and the member 28.

Referring to Fig. 10, the numeral 31 indicates a plurality of sections adapted to be radially moved together to form an annular chamber 32, the walls of which are substantially of the same contour as the outer surfaces of the tire band. While the sections 31 are separated substantially as shown in dotted lines in Fig. 10, the drum 26 with the member 28 preferably partially inflated and with the tire assembly thereon, is moved into a central position with respect to the sections 31. The latter sections are then moved inwardly toward the outer surface of the assembly and as the portions 33 of the walls of the chamber 32 engage the extending portions of the band 18, the latter are pressed into engagement with the band 14 adjacent the beads, as shown in dotted lines in Fig. 10. It will be understood that the dotted line representation of the sections 31 in Fig. 10 does not define the limit of outward movement of these sections, but that the latter are capable of movement a sufficient distance to permit passage of the drum and tire band into and out of the chamber.

As soon as the chamber 32 is formed by bringing together the movable sections, additional fluid under pressure is admitted to the inflatable member 28. It has been found that a pressure of about 150 lbs. per square inch is sufficient in most cases, but this pressure obviously may be varied. As previously stated, the thinnest portion of the member 28 is located approximately in the center of the outer wall thereof and this construction insures initial expansion of the member at the center. Consequently, when fluid under pressure is admitted to the inflatable member after the tire assembly is arranged within the chamber 32, a compacting pressure will be initially exerted radially outwardly substantially at the center of the tire assembly, pressing the center of the latter against the chamber walls. After expansion at the center of the assembly, the compacting pressure operates progressively thereon from the center to the edges of the assembly, thereby forcing substantially all of the air therefrom and effectively uniting or bonding the components of the tire together in one operation without tension. The member 28 is then deflated, the sections 31 are separated, and the drum with its now completely formed tire band is retracted from the chamber. The tire band is removed from the drum and as shown in Fig. 11 is ready for further treatment (i. e. shaping and vulcanizing) in the usual manner. It is sometimes desirable to trim the edges of the tread band with a knife or other trimming device, and this preferably is done after the tire band has been removed from the drum, but it also may be done before the tread band is assembled with the plies.

It will be apparent that I have provided a novel method that will permit the various operations necessary in constructing a tire band to be divided among a number of operators, and that the simultaneous bonding or uniting of the bands and tread stock without tension by the uniform and equally distributed pressure, results in less air being entrapped in the carcass than was usual heretofore with other methods of forming a tire band. Moreover, it has been found in practice that tires built in accordance with my new method are not only as good, but in some respects better, than tires built with prior methods. For example, the cord angles are absolutely uniform throughout the entire circumference of the tire by reason of the fact that the respective plies 10, 11 and 19, 20 are given their endless form without imposing tension on the cord fabric. Furthermore, the bonding or uniting of the tread portion and the bands by uniform and equally distributed pressure permits a more even distribution of tread stock than previously has been possible.

It is to be understood that, while the invention is illustrated in connection with the construction of a four-ply tire, tires of substantially any desired number of plies can be built by the method. Also, it is obvious that the thickness of the plies is greatly exaggerated in the drawings in order to effectively illustrate the steps of the method, and that the spaces appearing in the assembly between the bands actually are much smaller than shown. In fact, these spaces are so small that in actual practice no difficulty has been experienced in completely forcing the air out of the spaces when the bands are bonded together by the action of the pressure fluid.

Also it is within the scope of my invention to assemble the plies and their associated parts such as beads, chafing strips, breaker strips, etc., into an endless band upon a conventional tire building drum, thereafter removing the assembled plies from the drum. The effective size of these plies then may be reduced as previously stated whereby the endless tread band may be placed around the plies, after which the complete assembly including the plies and tread will be bonded together as stated, by the uniform pressure available for this purpose.

Although I have illustrated and described one preferred manner in which the invention may be practiced, it will be apparent to those skilled in the art that the method is not so limited but that various modifications may be made therein without departing from the spirit of the invention or the scope of the sub-joined claims.

I claim:

1. A method of building pneumatic tires in band form which comprises assembling the carcass and tread portion of the tire into a unit in substantially unbonded relation, and bonding them together by the application of radially outwardly directed force.

2. A method of building pneumatic tires in band form which comprises forming the plies of which the tire is composed into endless bands, assembling the bands and the tread portion into a unit in substantially unbonded relation, and simultaneously bonding said bands and said tread stock together.

3. A method of building pneumatic tires in band form which comprises forming the plies of which the tire is composed into endless bands, assembling the bands and the tread portion into a unit in substantially unbonded relation, and simultaneously bonding said bands and said tread stock together by the application of radially outwardly directed force.

4. A method of building pneumatic tires in band form which comprises forming the carcass of the tire into an endless band, preforming the tread stock into an endless band, assembling the endless bands into a unit in substantially unbonded relation, and bonding them together by the application of radially outwardly directed force.

5. A method of building pneumatic tires in band form which comprises forming the plies of which the tire is composed into a plurality of endless bands, preforming the tread stock into a band, assembling the endless bands and the tread band into a unit in substantially unbonded relation, and simultaneously bonding said bands together.

6. A method of building pneumatic tires in band form which comprises forming the plies of which the tire is composed into a plurality of endless bands, preforming the tread stock into a band, assembling the endless bands and the tread band into a unit in substantially unbonded relation, and simultaneously bonding said bands together by the application of radially outwardly directed force.

7. The steps in the method of building pneumatic tires in band form which comprise forming the plies of which the tire is composed into a plurality of endless bands, incorporating beads with one of said bands, incorporating chafing strips and a breaker strip with another of said bands, and assembling said bands into a unit.

8. The steps in the method of building pneumatic tires in band form which comprise forming a band of tire material, incorporating beads with said band, forming a second band of tire material, incorporating chafing strips and a breaker strip with said second band, and assembling said bands into a unit.

9. A method of building pneumatic tires in band form which comprises forming a band of tire material, incorporating beads with said band, forming a second band of tire material, incorporating chafing strips and a breaker strip with said second band, assembling said bands, and then assembling a tread portion with said bands.

10. A method of building pneumatic tires in band form which comprises forming a band of tire material, incorporating beads with said band, forming a second band of tire material, incorporating chafing strips and a breaker strip with said second band, assembling said bands in substantially unbonded relation, assembling a preformed tread band with said other bands in substantially unbonded relation, and simultaneously bonding together all of said bands.

11. A method of building pneumatic tires in band form which comprises forming a band of tire material, incorporating beads with said band, forming a second band of tire material, incorporating chafing strips and a breaker strip with said second band, assembling said bands in substantially unbonded relation, assembling a preformed tread band with said other bands in substantially unbonded relation, and simultaneously bonding together all of said bands by the application of radially outwardly directed force.

12. A method of building pneumatic tires in band form which comprises forming the plies of which the tire is composed into a plurality of endless bands, incorporating beads with one of said bands, incorporating chafing strips and a breaker strip with another of said bands, assembling said bands, and then assembling a tread portion with said bands.

13. A method of building pneumatic tires in band form which comprises forming the plies of which the tire is composed into a plurality of endless bands, incorporating beads with one of said bands, incorporating chafing strips and a breaker strip with another of said bands, assembling said bands in substantially unbonded relation, assembling a preformed tread band with said other bands in substantially unbonded relation, and simultaneously bonding together all of said bands.

14. A method of building pneumatic tires in band form which comprises forming the plies of which the tire is composed into a plurality of endless bands, incorporating beads with one of said bands, incorporating chafing strips and a breaker strip with another of said bands, assembling said bands in substantially unbonded relation, assembling a preformed tread band with said other bands in substantially unbonded relation, and simultaneously bonding together all of said bands by the application of radially outwardly directed force.

15. The steps in the method of building pneumatic tires in band form which comprise forming an endless band of tire material and incorporating chafing strips and a breaker strip therewith before assembling the band with the rest of the carcass.

16. The steps in the method of building pneumatic tires in band form which comprise forming at least two bands of tire material, one of said bands being slightly wider than the other, said other band being of slightly greater diameter than said widest band, incorporating beads with said widest band by folding the margins of the latter over said beads, incorporating chafing strips and a breaker strip with the band of greatest diameter, and assembling said bands into a unit with the band of greatest diameter arranged outwardly of the other band.

17. The steps in the method of building pneumatic tires in band form which comprise forming at least two bands of tire material, one of said bands being slightly wider than the other, said other band being of slightly greater diameter than said widest band, incorporating beads with said widest band by folding the margins of the latter over said beads, incorporating chafing strips and a breaker strip with the band of greatest diameter, assembling said bands into a unit with the band of greatest diameter arranged outwardly of the other band, and then assembling a tread portion with said bands.

18. The method of building pneumatic tires in band form which comprises forming at least two bands of tire material, one of said bands being slightly wider than the other, said other band being of slightly greater diameter than said widest band, incorporating beads with said widest band by folding the margins of the latter over said beads, incorporating chafing strips and a breaker strip with the band of greatest diameter, assembling said bands into a unit in substantially unbonded relation with the band of greatest diameter arranged outwardly of the other band, assembling a preformed tread band with said other bands in substantially unbonded relation, and simultaneously bonding together all of said bands.

19. The method of building pneumatic tires in band form which comprises forming at least two bands of tire material, one of said bands being slightly wider than the other, said other band being of slightly greater diameter than said widest band, incorporating beads with said widest band by folding the margins of the latter over said beads, incorporating chafing strips and a breaker strip with the band of greatest diameter, assembling said bands into a unit in substantially unbonded relation with the band of greatest diameter arranged outwardly of the other band, assembling a preformed tread band with said other bands in substantially unbonded relation, and simultaneously bonding together all of said bands by the application of radially outwardly directed force.

20. A method of building pneumatic tires in band form, which consists in making up different portions of the tire including the tread and carcass in separate and distinct units, assembling the units in unbonded relation, and then bonding all the units together in unvulcanized condition in one operation.

21. A method of building pneumatic tires in band form, which consists in making up different portions of the tire including the tread and carcass in separate and distinct units, assembling the units in unbonded relation, and then subjecting the assembly to a compacting pressure to bond the units together.

22. A method of building pneumatic tires in band form, which consists in making up different portions of the tire in separate and distinct units, assembling the units in unbonded relation, and then bonding all the units together by a compacting pressure applied thereto and operating thereon progressively from the center to the edges of the assembly.

23. A method of building pneumatic tires in band form, which consists in making up different portions of the tire in separate and distinct units, assembling the units in unbonded relation, and then compacting the complete assembly under heavy pressure against a surface conforming in shape and size to one side face of the final band.

24. A method of building pneumatic tires in band form, which consists in making up different portions of the tire in separate and distinct units, assembling the units in unbonded relation, and then forcing the complete assembly outwardly under heavy pressure against an encircling surface conforming in shape and size to the outer face of the final band.

25. A method of building pneumatic tires in band form, which consists in making up different portions of the tire in separate and distinct units, assembling the units in unbonded relation, and then subjecting the complete assembly to heavy pressure between an unyielding surface which engages one side face thereof throughout its extent, and an inflatable former which engages the other side face thereof throughout its extent.

26. A method of building pneumatic tires in band form, which consists in making up different portions of the tire in separate and distinct units, assembling the units in unbonded relation, placing the complete assembly within a metal ring conforming in shape and size to the outer face of the final band and forcing the assembly against said ring by fluid pressure applied to the inner face thereof.

27. A method of building pneumatic tires in band form, which consists in making up different portions of the tire in separate and distinct units, assembling the units in unbonded relation, placing the complete assembly within a metal ring conforming in shape and size to the outer face of the final band, and forcing the assembly against said ring by an inflatable former acting against the inner face of the assembly throughout its extent.

28. A method of building pneumatic tires in band form, which consists in making up the carcass in separate and distinct endless bands of rubberized fabric, one with beads applied to its outer edges, placing the bands one within another in centered relation, applying to the outer one of the bands thus assembled a rubber cover, and then bonding all the parts together in one operation.

29. A method of building pneumatic tires in band form, which consists in making up the carcass in separate and distinct endless bands of rubberized fabric, one with beads applied to its outer edges, placing the bands one within another in centered relation, applying over the outer one of the bands thus assembled a rubber cover prepared as a separate and distinct endless band, and then bonding all the parts together in one operation.

30. A method of building pneumatic tires in band form which consists in assembling the different portions of the tire including the tread and carcass in unbonded relation, and then bonding all the portions together in one operation.

31. A method of building pneumatic tires in band form which comprises forming the plies of which the tire is composed into a plurality of endless bands, incorporating beads with one of said bands, incorporating chafing strips and a breaker strip with another of said bands, assembling said bands in substantially unbonded relation, assembling a preformed tread band with said other bands in substantially unbonded relation, simultaneously bonding together all of said bands, and trimming the edges of said tread band.

32. A method of building pneumatic tires in band form which comprises forming the plies of which the tire is composed into endless bands, assembling the bands and the tread portion into a unit in substantially unbonded relation, simultaneously bonding said bands and said tread portion together, and trimming the edges of said tread portion.

33. In the method of building pneumatic tires in band form, the steps of making up the carcass in separate and distinct endless bands of rubberized fabric, one with beads applied to its outer edges, placing the bands one within another in centered relation, and then bonding the bands together as a unit by subjecting them to a compacting pressure without tensioning the bands.

34. In the method of building pneumatic tires in band form, the steps of making up the carcass in separate and distinct endless bands of rubberized fabric, one with beads applied to its outer edges, placing the bands one within another in centered relation, and then bonding the bands together as a unit by subjecting them to a compacting pressure applied thereto and operating thereon progressively from the center to the edges of the bands.

35. In the method of building pneumatic tires in band form, the steps of making up the carcass in separate and distinct endless bands of rubberized fabric, one with beads applied to its outer edges, placing the bands one within another in centered relation, and then bonding the bands together as a unit by compacting the bands under heavy pressure against a surface conforming in shape and size to one side face of the final band.

36. In the method of building pneumatic tires in band form, the steps of making up the carcass in separate and distinct endless bands of rubberized fabric, one with beads applied to its outer edges, placing the bands one within another in centered relation, and then bonding the bands 37. In the method of building pneumatic tires in band form, the steps of making up the carcass in separate and distinct endless bands of rubberized fabric, one with beads applied to its outer edges, placing the bands one within another in centered relation, and then bonding the bands together as a unit by subjecting the band to heavy pressure between an unyielding surface which engages one side face thereof throughout its extent and an inflatable former which engages the other side face thereof throughout its extent.

38. In the method of building pneumatic tires in band form, the steps of making up the carcass in separate and distinct endless bands of rubberized fabric, one with beads applied to its outer edges, placing the bands one within another in centered relation, and then bonding the bands together as a unit by placing the bands within a metal ring conforming in shape and size to the outer face of the final band and forcing the bands against said ring by fluid pressure applied to the inner face thereof.

39. In the method of building pneumatic tires in band form, the steps of making up the carcass in separate and distinct endless bands of rubberized fabric, one with beads applied to its outer edges, placing the bands one within another in centered relation, and then bonding the bands together as a unit by placing the bands within a metal ring conforming in shape and size to the outer face of the final band, and forcing the bands against said ring by an inflatable former acting against the inner face of the assembly throughout its extent.

40. A method of building pneumatic tires in band form which consists in assembling the different portions of the tire in unbonded relation, and then bonding all the portions together in one operation by subjecting them to a compacting pressure without tensioning them.

41. A method of building pneumatic tires in band form which consists in assembling the different portions of the tire in unbonded relation, and then bonding all the portions together in one operation by subjecting them to a compacting pressure applied thereto and operating thereon progressively from the center to the edges of the assembly.

42. A method of building pneumatic tires in band form which consists in assembling the different portions of the tire in unbonded relation, and then bonding all the portions together in one operation by compacting the assembly under heavy pressure against a surface conforming in shape and size to one side of the final band.

43. A method of building pneumatic tires in band form which consists in assembling the different portions of the tire in unbonded relation, and then bonding all the portions together in one operation by forcing the assembly outwardly under heavy pressure against an encircling surface conforming in shape and size to the outer face of the final band.

44. A method of building pneumatic tires in band form which consists in assembling the different portions of the tire in unbonded relation, and then bonding all the portions together in one operation by subjecting the assembly to heavy pressure between an unyielding surface which engages one side face thereof throughout its extent and an inflatable former which engages the other side face thereof throughout its extent.

45. A method of building pneumatic tires in band form which consists in assembling the different portions of the tire in unbonded relation, and then bonding all the portions together in one operation by placing the assembly within a metal ring conforming in shape and size to the outer face of the final band, and forcing the assembly against said ring by fluid pressure applied to the inner face thereof.

46. A method of building pneumatic tires in band form which consists in assembling the different portions of the tire in unbonded relation, and then bonding all the portions together in one operation by placing the assembly within a metal ring conforming in shape and size to the outer face of the final band, and forcing the assembly against said ring by an inflatable member acting against the inner surface of the assembly throughout its extent.

WILL C. STATE.